(12) United States Patent
Nooralahiyan et al.

(10) Patent No.: US 6,775,463 B1
(45) Date of Patent: Aug. 10, 2004

(54) VIDEO DATA RECEIVER AND METHOD OF DISPLAYING SAID DATA

(75) Inventors: Amir Nooralahiyan, Bramhope (GB); Rahul Mehra, Pudsey (GB)

(73) Assignee: Pace Micro Technology PLC, Saltaire (GB)

(*) Notice: Subject to any disclaimer, the term of this patent is extended or adjusted under 35 U.S.C. 154(b) by 0 days.

(21) Appl. No.: 09/477,241

(22) Filed: Jan. 4, 2000

(30) Foreign Application Priority Data

Jan. 8, 1999 (GB) .............................................. 9900333

(51) Int. Cl.$^7$ ................................................. H04N 5/91
(52) U.S. Cl. ............................. 386/68; 386/46; 348/571
(58) Field of Search ............................ 386/46, 68, 109, 386/112; 348/571, 714; 725/88, 90, 102; 360/13

(56) References Cited

U.S. PATENT DOCUMENTS

| | | | |
|---|---|---|---|
| 4,698,664 A | | 10/1987 | Nichols et al. |
| 5,371,551 A | * | 12/1994 | Logan et al. ............... 348/571 |
| 5,438,423 A | * | 8/1995 | Lynch et al. ............... 386/109 |
| 5,774,186 A | | 6/1998 | Brodsky et al. |
| 5,838,876 A | | 11/1998 | Iwamura |
| 6,233,389 B1 | * | 5/2001 | Barton et al. ............... 386/68 |
| 6,496,980 B1 | * | 12/2002 | Tillman et al. ............... 725/90 |

FOREIGN PATENT DOCUMENTS

| | | |
|---|---|---|
| EP | 0 711 084 A2 | 5/1996 |
| EP | 0713334 A2 | 5/1996 |
| EP | 0 748 130 A2 | 12/1996 |
| EP | 0 784 401 A2 | 7/1997 |
| GB | 2 329 997 | 4/1999 |
| WO | 95/28707 | 10/1995 |
| WO | 97/46007 | 12/1997 |

* cited by examiner

Primary Examiner—Thai Tran
Assistant Examiner—Christopher Onuaku
(74) Attorney, Agent, or Firm—Head, Johnson & Kachigan

(57) ABSTRACT

The invention relates to an improvement in receivers for receiving broadcast video data for generating a video display from said data and also to the method of displaying said data. The invention provides for a memory into which received data can be directed and said data may also at the same time or previously have been used to generate a video display on a display screen. The data in the memory can be called up to generate a video display thereafter and the speed of the display may be selected so as to provide, for example, a slow motion or freeze frame display. The facility allows the user to select to regenerate a display which they may already have seen at the initial video display and further to generate the display in a slow motion sequence. The memory can be updated with newly received data. In addition, or alternatively, the memory may be provided to receive packets of data which are selected for storage and said packets of data in conjunction to provide a data sequence which can be selected to be viewed.

15 Claims, 2 Drawing Sheets

US 6,775,463 B1

VIDEO DATA RECEIVER AND METHOD OF DISPLAYING SAID DATA

CROSS-REFERENCE TO RELATED APPLICATIONS

This application claims priority to G.B. Application No. 9900333.7 filed 08 Jan. 1999.

BACKGROUND OF THE INVENTION

The subject matter of this invention relates to improvements for receivers of the type used to receive transmitted broadcast video signals and particularly, although not necessarily exclusively, the digital signal receiver. A digital receiver allows the transmitted data which is in an encoded format to improve efficiency and reduce code length, to be received, decoded and displayed on screen for viewing.

A known problem with digital data receivers is that while they decode and display broadcast information efficiently they are at present only capable of acting as "real time" processing devices and do not hold any significant historical information. This means that the viewer of the television or other means connected to the receiver is denied the opportunity to repeat the last quantity of video data to be displayed in normal replay or slow motion mode. This is however a feature which has been found to be desirable as the viewer may wish to review some material which has previously been displayed and can be used in many different functions such as, for example, when viewing sports events to look at a goal or particularly skillful piece of play.

SUMMARY OF THE INVENTION

The aim of the present invention is to allow the ability for a receiver to be provided with replay and/or slow motion functions for video content which is received and displayed on a television set or other display medium.

In a first aspect of the invention there is provided a receiver for the reception of transmitted data and generation of a display of the video data on a display screen connected therewith, said receiver including a physical memory in which video data is stored and from which, for a time period following display, said video data can be selectively retrieved to create a video display on the display screen and characterised in that said memory includes a first portion of memory which receives the most recently transmitted data received by the receiver at each instant, and a remainder portion in which is stored, in sequence, packets of data which have previously been received and displayed and have been transferred from said first portion over time.

In a preferred embodiment of the apparatus there is provided a transmitted data receiver for the reception of data and generation of a display of the video data on a display screen and wherein said receiver includes a physical memory, in which video data is stored, which video data can be selectively used to create a video display on the display screen and the memory includes a first portion which acts as a moving buffer memory portion which moves and is updated with the passage of time and into which the most recently displayed data packets are stored. Over time the first portion is updated with more recent data packets and the data packets previously held in the first portion move into the second portion of the memory which stores the data packets in time order for a period of time, the length of which can be determined at least partially by the size of the memory. Typically a circular memory construction is used and, as the first portion "moves" around the memory, and is updated and receives the most recently displayed data, so the oldest data held in the second portion is overwritten and this process continues as data continues to be processed and displayed by the receiver. Thus in a preferred embodiment, at any one time, the memory, in accordance with the invention, holds data which has most recently been processed and displayed and further data in time order therefrom up to a certain historical time limit and the data held in that memory can be retrieved for display upon command by the user of the apparatus and in one of plurality of user selectable formats.

In one embodiment the video data stored in the memory has been used to generate a video display.

Thus the memory receives data from the data transport stream from the broadcaster and the same is used to generate the video display and at the same time is stored in the physical memory so that at any instance a predesignated quantity of the most recently received data is readily available in the memory.

Preferably the memory is a circular buffer memory in operation which means that the content of the memory at any one time is successively overwritten as new packets of video data are routed to and through the memory to replace the oldest data in the memory and so on.

Preferably the capacity of the memory is set so as to be sufficient to allow the storage of meaningful quantities of data so as to facilitate the storage of a displayed video content or a series of packets of data so that the video packets are accessible for a predetermined period of time following display to allow the same to be replayed or for the same to be used in slow motion. Typically the length of the video packets which can be viewed after initial display is directly proportional to the size of the buffer memory provided and the capacity is such as to allow a video display of a meaningful length to be displayed in slow motion or replay mode.

In a further feature of the invention, the display interrupt at the video driver layer can be manipulated in respect of the contents of the buffer memory so that the same can be displayed at variable speeds to achieve the effect of variable slow motion.

In a further aspect of the invention there is provided a method of receiving and displaying transmitted data, said method comprising the steps of:

encoding a stream of data into digital encoded data;

transmitting the encoded data for reception by at least one data receiver;

decoding the received data into a form for the generation of a video display on a display screen connected to the data receiver and characterised in that the data receiver includes or is connected to a memory in which the received data can be stored for selected retrieval within a time period after the initial display to create a video display, and wherein said memory includes a first portion into which the most recently received data is placed, and a remainder portion into which data from the first portion passes.

In one embodiment the received data is simultaneously decoded to create the video display and saved in the memory for selective use in generating a display.

In one embodiment the memory contains packets of received data with the oldest packets of data overwritten by most recently received packets of data over time.

In an alternative embodiment packets of data can be selectively stored in a memory to generate a series of packets of data for selected display, such as for example, a series of packets of data representing the highlights of a broadcast sporting event.

In one embodiment the speed of the display of data from the memory can be selected, and may be, for example, selected to provide a slow motion display of the data, or even a freeze frame effect.

In a yet further aspect of the invention there is provided a receiver for the reception of transmitted data and generation of a display of the video data on a display screen connected therewith, said receiver including a physical memory in which video data is stored and from which, for a time period following display, said video data can be selectively retrieved to create a video display on the display screen and characterised in that said memory includes a first portion defined as the portion of the memory defined between the producer and consumer pointers which receives the most recently transmitted data received by the receiver at each instant, and a remainder portion of the memory and in which is stored, in sequence, packets of data which have previously been received and displayed and which are transferred from said first portion as producer and consumer pointers move around the circular memory configuration.

The invention as herein described provides novel features in that it can provide a freeze frame functionality, can allow the replay of previously displayed video clips and can allow the replay of the same as many times as required. In other functions, the invention also provides for slow motion functionality and allows for the variation in slow motion speed as required.

BRIEF DESCRIPTION OF THE DRAWINGS

Specific embodiments of the invention will now be described with reference to the accompanying drawings, wherein.

DETAILED DESCRIPTION OF THE PREFERRED EMBODIMENTS

Figure 1:
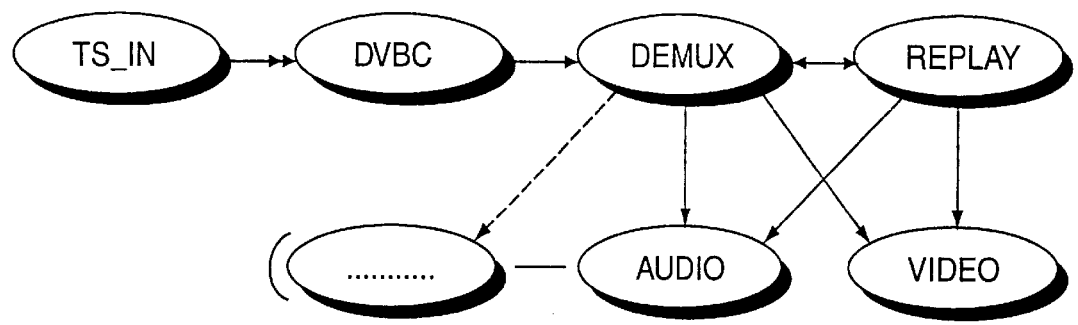
FIG. 1 illustrates the basic interaction of the main processes responsible for TS input, de-scrambling, de-multiplexing/routing of the TS content and the video replay task.

To allow the receiver with memory storage to be operated the following steps are followed with reference to FIG. 1. Tasks are initialised at start-up and instantiated to run concurrently: The TS-IN process compares the Packet ID (PID) of the incoming Transport Packet with the PID Action Table held in the memory of the receiver to distinguish between packets that should be routed to the memory and the packets of data which can be rejected. The TS-IN process initially searches for PID 0 which contains the Program Association Table (PAT). The DVBC process determines whether or not the data packet needs unscrambling and, if so, and a valid key exists, the packets are decrypted and repacked before being passed on to the DEMUX process. The DEMUX process establishes the type of payload by examining and extracting the relevant information from the PID table and routing it to the relevant process. For example, if the information is video, it is routed to the VIDEO process and so on. VIDEO, AUDIO and other consumer processes provide simple interfaces to the device drivers. The REPLAY process interacts with the DEMUX/Routing process and the Video process. The VIDEO process typically can not receive video packets from DEMUX and REPLAY processes simultaneously. Circular buffer memories are used for inter-process communication.

Figure 2:
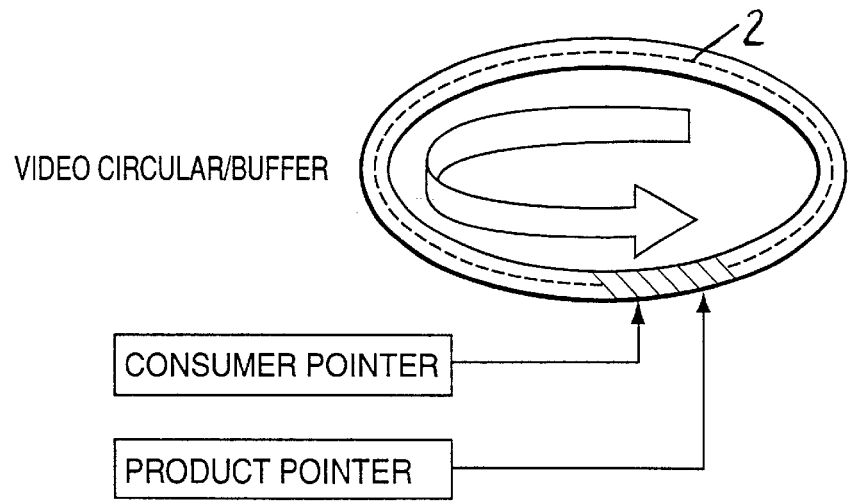
FIG. 2 illustrates the operation of the memory in the form of a buffer in one embodiment.

The interaction between the DEMUX routing process (producer) and the VIDEO process (consumer) utilises a short buffer of few data packets. This is to say that as soon as these few packets of video data are available, they are routed to the video process. This, in turn, interacts with the video driver. Thus, the producer pointer is constantly moving round the circular buffer and is followed closely by the consumer pointer as illustrated in FIG. 2 to define a first portion of the memory in accordance with the invention. The dotted line 2 consists of previously decoded and displayed video packets and is referred to as the second or remainder portion of the memory in accordance with the invention also referred top as the history loop. When the receiver or set top box (STB) is instructed to operate the video replay mode such as by the reception of a signal from a remote control, the REPLAY process first interrupts the DEMUX process and halts the subsequent routing of the video data packets. The REPLAY process then takes over the task of the DEMUX/Routing process and channels the video packets in residence in the history loop (in the memory) to the VIDEO process.

The implementation of video replay is achieved by accessing the video packets in the history loop and the packets are subsequently interfaced to the video driver. The length of the history loop is dependent on the physical size of the memory in the receiver in accordance with the invention.

Figure 3:
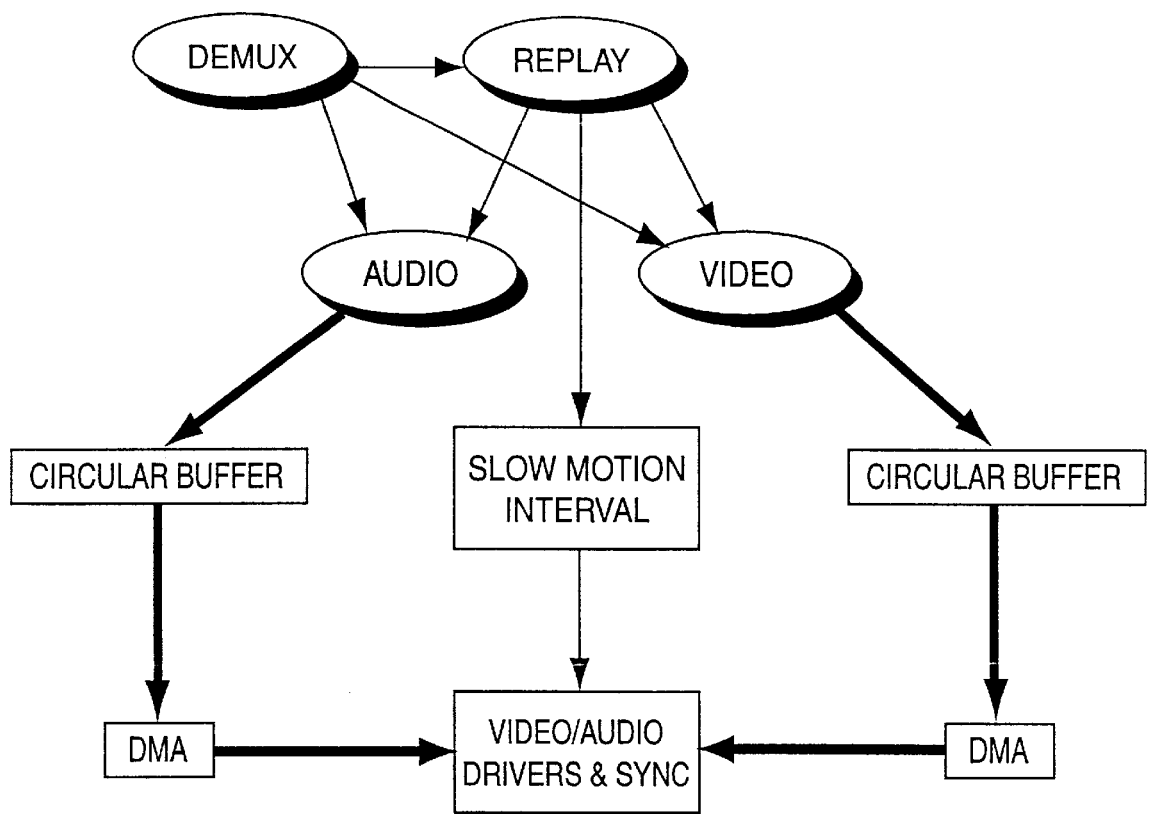
FIG. 3 illustrates in schematic form the replay of the stored video data.

The implementation of slow motion replay is somewhat different in that, while video replay may be accomplished at process level, the slow motion functionality is implemented at driver level. This is because packets depicted in the circular buffer memory have no timing relationship with adjacent packets. Thus a simple delay mechanism between packet transfer to video driver would not result in the desired slow motion effect. As shown in FIG. 3, the REPLAY task sets the slow motion interval and this is used as a parameter in the driver interrupt handling routine to adjust the number of times a picture field/frame is displayed.

There are two approaches to achieve the desired effect in slow motion depending on whether the source picture encoding is field-based or frame-based. In the case of frame based encoded video data, both display fields of the picture are at the same temporal reference. In this case the slow motion is achieved by repeatedly displaying both fields of the decoded picture to obtain the desired degree of slow motion. In the case of field-based encoded video data the two fields belonging to the same picture are at different time instances with the second field occurring after the first. In this scenario the slow motion requires the repetition of each field separately. Two known techniques; vertical intra-field interpolation or horizontal inter-field interpolation, have been implemented to smooth out the effect of artefacts.

Another implication of slow motion replay is the number of frame (picture) buffers allocated for decoding and displaying a sequence. In a 4-frame buffer allocation, 2 frames are utilised for reference frames (I or P frames) and in the worst case scenario in a GOP sequence, whereby there is more than one B frame between two reference frames, one frame buffer is used for decoding the current B frame while the remaining frame buffer is used to display the previously decoded B frame. In a 3-frame implementation two reference frame buffers are used, leaving one buffer to share the decoding and displaying the B frames. This is achieved by overwriting the rows of the buffer already displayed with the decoded information for the next frame. Thus in a 3-frame buffer allocation, where the decoding and display of the video data is field-based, the information in the buffer for B frame is overwritten and potentially lost at every VSYNC. In this case the decoding must be halted during displaying the same B frame repeatedly to achieve the slow motion effect.

A specific example of the video replay and slow motion functions is now described for the purpose of illustration and in a non-limiting manner on the interpretation of the scope of the patent application and in the invention described herein.

In this specific example, the physical memory in the receiver is increased from 4 Mbytes to 8 Mbytes of DRAM. This provides a memory heep size of 6 Mbytes which is capable of containing a link-list of 30,000 video packets in the history or second portion of the memory loop which equates to about six seconds of video replay in real time.

The video replay is therefore implemented using the following steps:
1. Interrupt and halt the DEMUX/Routing process
2. Assign the consumer pointer to the producer pointer (i.e. at the beginning of the history loop)
3. Advance the consumer pointer to the NEXT video packet
4. Route the video packet to the video process
5. DMA the history packets to the video driver
6. Decode and display the video packets in the history loop
7. Repeat from No. 3 until the consumer pointer completes the history loop The video replay in slow motion can be implemented using in this embodiment 3-frame buffer allocation for A GOP of I.B.P.B.P, . . . B sequence with field based decoding of pictures. The slow motion is then implemented by repeating the display function for both fields of each frame in the GOP sequence.

The implementation of freeze frame can also be achieved by interrupting the DEMUX process to halt the Routing of video content to the driver. For improved clarity of image, the freeze frame avoids B frames and latches to the nearest reference frame (I or P frame).

These functionalities can be operated by a remote control and accessed by a freeze-frame button on the remote control to halt the DEMUX/Routing process. Once the receiver is in freeze-frame/replay mode, other buttons are used for replay and slow motion functionalities. Button no. 1 is used for normal replay and button nos. 2 to 9 are used for varying the speed of slow motion replay with button no. 9 being the slower replay (about 2.8 frames per second) select button. Pressing the freeze-frame button again re-installs DEMUX/routing tasks and the receiver switches to normal mode.

While the invention has been described with a certain degree of particularly, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A receiver for the reception of transmitted data and generation of a display of video data on a display screen connected therewith, said receiver comprising:
    a physical memory in which video data is stored and from which, for a time period following display, the video data can be selectively retrieved to create a video display on the display screen, the physical memory is sufficient to allow the storage of quantities of data to facilitate the storage of a displayed video packet or series of packets for a predetermined period of time following display to allow the same to be replayed or for the same to be used in slow motion, the length of the video display which can selectively be viewed after initial display is directly proportional to the size of the memory and wherein said physical memory includes,
    a first portion of memory which receives the most recently transmitted data received by the receiver at each instant, and
    a remainder portion in which is stored, in sequence, packets of data which have previously been received and displayed and which are transferred from said first portion over time.

2. A receiver according to claim 1 wherein the input of data into said first portion causes the movement of previously held data from said first portion into said remainder portion and, if the capacity of said remainder portion is filled, the removal of the oldest data from said remainder portion and so on in a progressive manner over time.

3. A receiver according to claim 2 wherein said memory operates as a circular or loop configured memory so that when capacity of said memory remainder portion is reached the same is successively overwritten as new packets to data are routed to and through said memory to replace the oldest data in said memory and so on.

4. A receiver according to claim 1 wherein the selected data can be displayed at selected variable speeds of display as a display interrupt at the video driver layer is manipulated in respect of the contents of said memory.

5. A receiver according to claim 1 wherein there is provided a facility to select to save a specified packet of data in said memory and to add further packets of data to said memory selectively.

6. A receiver according to claim 5 wherein the saved packets of data can be re-displayed individually or as a sequence of packets of data.

7. A receiver according to claim 1 wherein said first memory portion acts as a buffer.

8. A receiver according to claim 7 wherein said first portion of memory is defined as the portion of the memory which lies between producer and consumer pointers.

9. A receiver according to claim 8 wherein said producer and consumer pointers move around a circular configured buffer over time, and as they do so overwrite the oldest data held in said memory at that time.

10. A method of receiving and displaying transmitted data, said method comprising the steps of:
    encoding a stream of data into digital encoded data;
    transmitting the encoded data for reception by at least one data receiver;
    decoding the received data into a form for the generation of a video display on a display screen connected to at least one data receiver including a memory having a first portion into which the most recently received data is placed and a remainder portion into which data from the first portion passes and having a capacity sufficient to allow storage of quantities of data to facilitate the storage of a displayed video packet or series of packets for a predetermined period of time following display to allow the same to be replayed or for the same to be used in slow motion;
    storing the received data for selected retrieval within a time period after the initial display to create a video display, and wherein the length of the selected video display is directly proportional to the size of the moving circular buffer memory; and
    retrieving of the stored data by a user.

11. A method according to claim 10 wherein the received data is simultaneously decoded to create an initial video display and saved in said first portion in said memory for selective use in generating a display thereafter.

12. A method according to claim 10 wherein said memory contains packets of received data with the oldest packets of data overwritten by the most recently received packets of data over time.

13. A method according to claim 10 wherein said packets of data are selectively stored in a memory to generate a series of packets of data for selected display.

14. A method according to claim 10 wherein the speed of the display from said memory can be selected by a user.

15. A method according to claim 14 wherein the speed of display is selected to provide a slow motion display of the data.

* * * * *